(12) United States Patent
Ju et al.

(10) Patent No.: US 11,777,157 B2
(45) Date of Patent: Oct. 3, 2023

(54) BATTERY MODULE

(71) Applicant: LG CHEM, LTD., Seoul (KR)

(72) Inventors: Eun-Ah Ju, Daejeon (KR); Hang-June Choi, Daejeon (KR); Sung-Won Seo, Daejeon (KR); Dal-Mo Kang, Daejeon (KR); Jeong-O Mun, Daejeon (KR); Yoon-Koo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 240 days.

(21) Appl. No.: 16/469,368

(22) PCT Filed: Feb. 12, 2018

(86) PCT No.: PCT/KR2018/001822
§ 371 (c)(1),
(2) Date: Jun. 13, 2019

(87) PCT Pub. No.: WO2019/004553
PCT Pub. Date: Jan. 3, 2019

(65) Prior Publication Data
US 2019/0393567 A1    Dec. 26, 2019

(30) Foreign Application Priority Data

Jun. 27, 2017 (KR) ........................ 10-2017-0081353

(51) Int. Cl.
*H01M 10/613* (2014.01)
*H01M 10/625* (2014.01)
(Continued)

(52) U.S. Cl.
CPC .......... *H01M 10/613* (2015.04); *B60L 50/64* (2019.02); *B60L 58/26* (2019.02); *H01M 10/625* (2015.04);
(Continued)

(58) Field of Classification Search
CPC ....................... H01M 10/6556; H01M 10/613
See application file for complete search history.

(56) References Cited

U.S. PATENT DOCUMENTS 8,846,233 B2    9/2014  Lee et al.
2011/0212355 A1  9/2011  Essinger et al.
(Continued)

FOREIGN PATENT DOCUMENTS

CN      205452392 U    8/2016
EP      2 997 622 A1   3/2016
(Continued)

OTHER PUBLICATIONS

WO-2018062869-A1 Translation from espacenet (Year: 2018).*
(Continued)

*Primary Examiner* — Nathanael T Zemui
(74) *Attorney, Agent, or Firm* — Morgan, Lewis & Bockius LLP

(57) ABSTRACT

Disclosed is a battery module including a module housing capable of effectively increasing an energy density while improving the heat dissipation efficiency. The battery module includes a cell assembly having a plurality of secondary batteries; and a module housing having at least one sidewall to accommodate the cell assembly in an inner space defined by the sidewall and having a cooling channel embedded in the sidewall.

19 Claims, 8 Drawing Sheets

(51) Int. Cl.
  *H01M 10/6556* (2014.01)
  *B60L 50/64* (2019.01)
  *B60L 58/26* (2019.01)
  *H01M 50/211* (2021.01)

(52) U.S. Cl.
  CPC ..... *H01M 10/6556* (2015.04); *H01M 50/211* (2021.01); *H01M 2220/20* (2013.01)

(56) References Cited

U.S. PATENT DOCUMENTS

| | | |
|---|---|---|
| 2011/0304297 A1 | 12/2011 | Sohn |
| 2012/0009457 A1* | 1/2012 | Lee ................... B60L 11/1874<br>429/120 |
| 2012/0315529 A1* | 12/2012 | Jin .................... H01M 10/6556<br>429/120 |
| 2013/0207459 A1* | 8/2013 | Schroder ............. H01M 10/625<br>307/10.1 |
| 2014/0377623 A1* | 12/2014 | Pyzza ................... H01M 10/61<br>429/120 |
| 2015/0093613 A1* | 4/2015 | Obasih ................ H01M 10/647<br>429/82 |
| 2016/0036102 A1 | 2/2016 | Suzuki et al. |
| 2016/0226042 A1* | 8/2016 | Hartmann ........... H01M 10/659 |
| 2018/0097265 A1* | 4/2018 | Tarlau ................. H01M 10/613 |
| 2018/0316073 A1* | 11/2018 | Ruehle ............. H01M 10/6557 |

FOREIGN PATENT DOCUMENTS

| | | |
|---|---|---|
| EP | 3 025 384 A2 | 6/2016 |
| JP | 2014127402 A | 7/2014 |
| KR | 10-2010-0041452 A | 4/2010 |
| KR | 10-2011-0135198 A | 12/2011 |
| KR | 10-2013-0005004 A | 1/2013 |
| KR | 10-2013-0033531 A | 4/2013 |
| KR | 10-2014-0146707 A | 12/2014 |
| KR | 10-1501026 B1 | 3/2015 |
| KR | 10-2017-0019229 A | 2/2017 |
| WO | WO-2018062869 A1 * | 4/2018 ........ H01M 10/6556 |

OTHER PUBLICATIONS

Partial Supplementary European Search Report dated Feb. 13, 2020, issued in corresponding EP Patent Application No. 18824223.4.
Extended European Search Report dated May 29, 2020, issued in corresponding EP Patent Application No. 18824223.4.
International Search Report dated Jul. 13, 2018, issued in corresponding International Application No. PCT/KR2018/001822.

* cited by examiner

BATTERY MODULE

TECHNICAL FIELD

The present application claims priority to Korean Patent Application No. 10-2017-0081353 filed on Jun. 27, 2017 in the Republic of Korea, the disclosures of which are incorporated herein by reference.

The present disclosure relates to a battery module accommodating a plurality of secondary batteries, and more particularly, to a battery module and a battery pack including a module housing in which a cooling channel is provided to effectively emit heat generated from a cell assembly.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. The lithium secondary battery includes an electrode assembly in which a positive electrode plate coated with the positive electrode active material and a negative electrode plate coated with the negative electrode active material are disposed with a separator being interposed therebetween, and an exterior, namely a pouch exterior, sealably containing the electrode assembly together with an electrolyte.

In recent years, secondary batteries have been widely used not only in small-sized devices such as portable electronic devices but also in medium-sized or large-sized devices such as vehicles and power storage devices. When the secondary batteries are used in the middle-sized or large-sized devices, a large number of secondary batteries are electrically connected to increase capacity and power. In particular, pouch-type secondary batteries are widely used for the middle-sized or large-sized devices since they may be easily stacked.

Meanwhile, as a need for a large-capacity structure has increased recently along with utilization as an energy storage source, there is an increasing demand for a battery pack having a structure in which a plurality of battery modules, each having a plurality of secondary batteries connected in series and/or in parallel, are aggregated.

Since the battery pack having a plurality of battery modules is manufactured such that a plurality of secondary batteries are densely packed in a narrow space, it is important to easily discharge heat generated from each secondary battery. Further, since the secondary battery is charged or discharged by an electrochemical reaction, the secondary battery is affected by ambient temperature conditions.

For example, if the charging/discharging process is performed under a high temperature condition in which the optimum temperature is not maintained, the charging/discharging efficiency of the secondary battery is lowered, and accordingly the performance may not be ensured during normal operation.

Thus, the conventional battery module separately includes a cooling member for cooling the heat generated from the secondary battery during the production of electricity to properly maintain the temperature of the secondary battery.

FIG. 1 is a cross-sectioned view schematically showing a conventional battery module.

As shown in FIG. 1, a conventional battery module 10 having a cooling member includes a pack tray 13 made of a material with high thermal conductivity and installed at a lower surface of a module housing 11. That is, in the conventional art, the pack tray 13 absorbs the heat generated by each secondary battery 12 of the cell assembly and transfers the absorbed heat to a heatsink 14 installed to contact a bottom of the pack tray 13, and the heatsink 14 is cooled again by a cooling water.

However, since the conventional battery module has a separate heatsink provided at a lower portion or an upper portion, when the height of the battery module is limited in a vertical direction as in a vehicle, there is a limit in the space of the battery module in the vertical direction, and thus there is a limit to increase the energy density by increasing the size of the module.

Further, in the conventional battery module, the heat generated from the secondary battery is firstly transferred to the module housing, the heat of the module housing is transferred to the pack tray again, and finally the heat is transferred to the heatsink. Thus, the heat is transferred via conduction regions of several members, thereby greatly deteriorating the heat dissipation efficiency.

DISCLOSURE

Technical Problem

The present disclosure is designed to solve the problems of the related art, and therefore the present disclosure is directed to providing a battery module and a vehicle, which includes a module housing capable of effectively increasing an energy density while improving the heat dissipation efficiency.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a cell assembly having a plurality of secondary batteries; and a module housing having at least one sidewall to accommodate the cell assembly in an inner space defined by the sidewall and having a cooling channel embedded in the sidewall.

Here, the sidewall may include an upper wall, a lower wall, a left wall and a right wall, and the cooling channel may be embedded in the left wall and the right wall.

Moreover, the cooling channel may be formed to pass through both ends of the sidewall of the module housing in a front and rear direction.

In addition, the cooling channel may have an inlet formed at one end surface of the sidewall of the module housing to introduce a coolant and an outlet formed at the other end surface of the sidewall of the module housing to discharge a coolant.

Further, the cooling channel may linearly extend from the inlet to the outlet.

Meanwhile, the module housing may have a hollow structure at which the inner space is opened at both sides.

Also, the battery module may further comprise a channel connection member for connecting the cooling channel to a cooling channel of another battery module.

Moreover, the channel connection member may be located at one end or the other end, or at both ends, of the sidewall of the module housing in a front and rear direction.

In addition, the channel connection member may include a connection tube partially inserted into and connected to the cooling channel of the battery module; and a stopper having a hollow structure to surround an outer surface of the connection tube.

Further, both ends of the connection tube may be configured to protrude in a front and rear direction from the stopper.

Meanwhile, the channel connection member may include a cooling tube inserted through the cooling channel of at least one battery module from one end thereof to the other thereof.

Also, the battery module may further comprise a gap adjustment member interposed between a plurality of battery modules and having a hollow structure into which the cooling tube is inserted.

Moreover, the gap adjustment member may include an upper cover configured to cover an upper surface of the cooling tube; and a lower cover coupled to the upper cover and configured to cover a lower surface of the cooling tube.

In addition, the cooling tube may include a plurality of tubes whose ends in a length direction are connected to each other.

In another aspect of the present disclosure, there is also provided a battery pack, comprising a battery module according to the present disclosure.

In another aspect of the present disclosure, there is also provided a vehicle, comprising a battery pack according to the present disclosure.

Advantageous Effects

According to an embodiment of the present disclosure, the battery module may effectively discharge the heat of the cell assembly, without a heatsink for discharging the heat generated from the battery module, unlike the conventional art, it is possible to reduce the manufacture cost and decrease the volume of the battery module.

Moreover, in the present disclosure, since the space in which the heatsink is placed, may be utilized more, it is possible to accommodate a cell assembly with a larger volume, and also the energy density may be increased.

Also, according to an embodiment of the present disclosure, when a linearly extending cooling channel is embedded in the sidewall of the module housing, it is possible to minimize the occurrence of interference while the coolant is moving along the cooling channel, and thus the coolant may circulate fast without stagnation to improve the cooling efficiency.

In addition, according to an embodiment of the present disclosure, by using a channel connection member, it is possible to easily connect the cooling channels of a plurality of battery modules and to arrange a plurality of battery modules at regular intervals.

Further, according to an embodiment of the present disclosure, when a long cooling tube is used to connect the cooling channels of a plurality of battery modules, it is possible to prevent leakage of the coolant, which is likely to occur in the connection structure between the cooling channels, and the plurality of battery modules may be evenly arranged in a certain direction.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
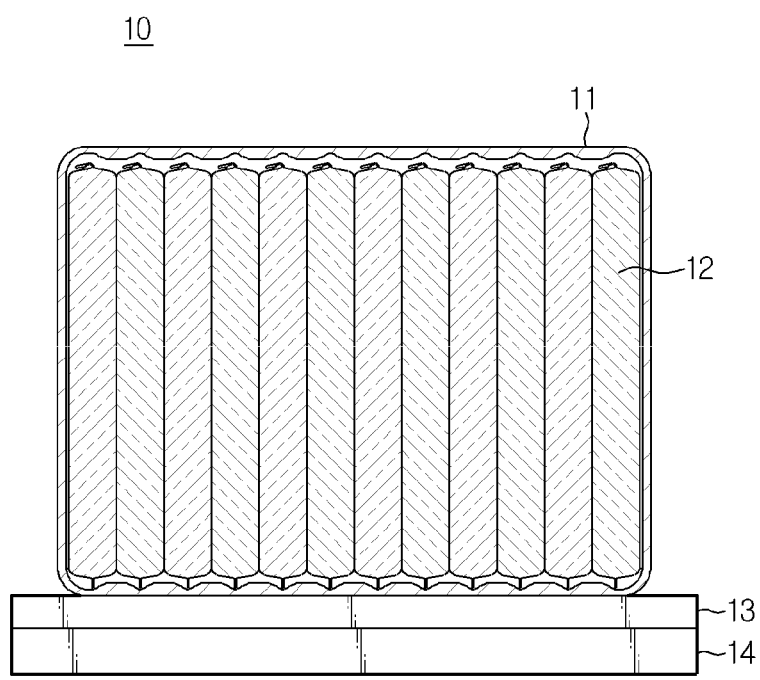
FIG. 1 is a cross-sectioned view schematically showing a conventional battery module.
Figure 2:
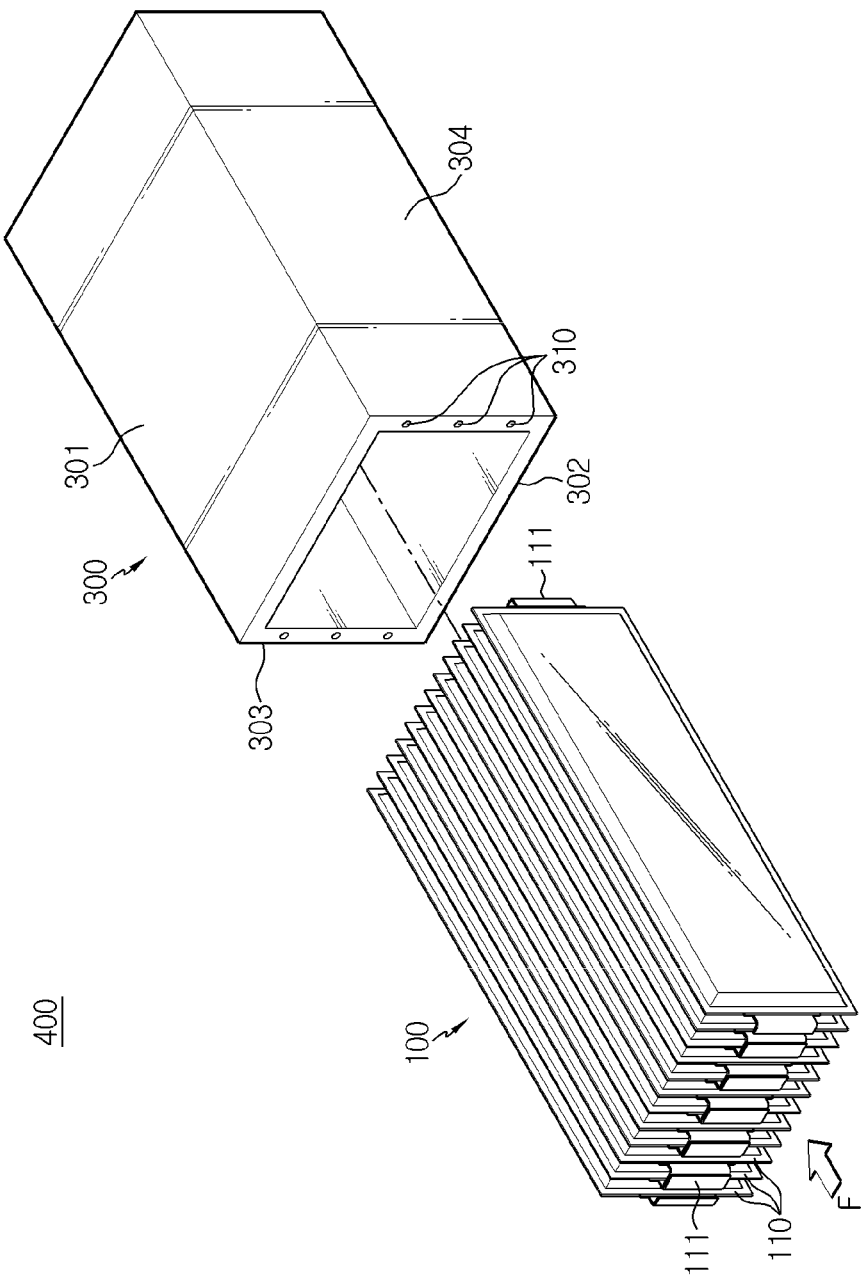
FIG. 2 is an exploded perspective view schematically showing a battery module according to an embodiment of the present disclosure.

FIG. 2 is an exploded perspective view schematically showing a battery module according to an embodiment of the present disclosure. In addition, FIG. 3 is a projected side view schematically showing a cooling channel provided at the battery module of FIG. 2.

Figure 3:
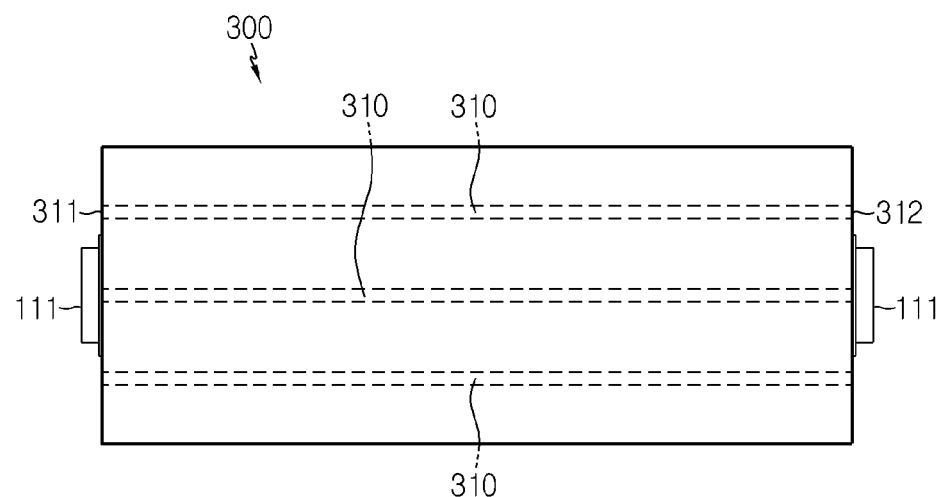
FIG. 3 is a projected side view schematically showing a cooling channel provided at the battery module of FIG. 2.

Referring to FIGS. 2 and 3, a battery module 400 according to the present disclosure may include a cell assembly 100 and a module housing 300.

The cell assembly 100 may include a plurality of secondary batteries 110.

At this time, the secondary battery 110 may be a pouch-type secondary battery 110. In particular, the pouch-type secondary battery 110 may include an electrode assembly, an electrolyte and a pouch exterior.

Here, the electrode assembly may be configured such that at least one positive electrode plate and at least one negative electrode plate are disposed with a separator interposed therebetween. More specifically, the electrode assembly may be classified into a wound type in which one positive electrode plate and one negative electrode plate are wound together with a separator, a stacking type in which a plurality of positive electrode plates and a plurality of negative electrode plates are alternately stacked with a separator interposed therebetween, and the like.

Also, the pouch exterior may be configured to have an outer insulating layer, a metal layer and an inner adhesive layer. The pouch exterior may be configured to include a metal thin film, for example an aluminum thin film, in order to protect inner components such as the electrode assembly and the electrolyte, to enhance electrochemical properties by the electrode assembly and the electrolyte, and to improve heat dissipation. In addition, the aluminum thin film may be interposed between insulating layers made of an insulating material so as to secure electrical insulation with components inside the secondary battery 110 such as the electrode assembly and the electrolyte or with other components outside the secondary battery 110.

In particular, the pouch exterior may be composed of two pouches, at least one of which may have a concave inner space formed therein. In addition, the electrode assembly may be accommodated in the inner space of the pouch. Also, sealing portions are provided at outer circumferential surfaces of two pouches, and the sealing portions are fused to each other to seal the inner space in which the electrode assembly is accommodated.

Each pouch-type secondary battery 110 may include an electrode lead 111, and the electrode lead 111 may include a positive electrode lead and a negative electrode lead.

In more detail, the electrode lead 111 may be configured to protrude forward or rearward from the sealing portion located at the outer circumference of the front or rear side of the pouch exterior. In addition, the electrode lead 111 may serve as an electrode terminal of the secondary battery 110. For example, as shown in FIG. 2, one electrode lead 111 may be configured to protrude forward from the secondary battery 110, and the other electrode lead 111 may configured to protrude rearward from the secondary battery 110.

Thus, according to this configuration of the present disclosure, in one secondary battery 110, there is no interference between the positive electrode lead and the negative electrode lead, thereby widening the area of the electrode lead 111. In addition, a welding process between the electrode lead 111 and a bus bar may be performed more easily.

In addition, a plurality of pouch-type secondary batteries 110 may be included in the battery module 400 and arranged to be stacked in at least one direction. For example, as shown in FIG. 2, a plurality of pouch-type secondary batteries 110 may be stacked in a right and left direction. At this time, each pouch-type secondary battery 110 may be disposed to stand approximately perpendicular to the ground, when being observed in the F direction, such that two broad surfaces are located at right and left sides, respectively, and the sealing portions are located at upper, lower, front and rear sides. In other words, each secondary battery 110 may be configured to stand in an upper and lower direction.

Meanwhile, the terms indicating directions such as front, rear, left, right, upper and lower directions used herein may be changed depending on the position of an observer or the shape of an object. For the sake of convenience of description, in the present specification, directions are classified into front, rear, left, right, upper and lower directions, based on the F direction.

The configuration of the pouch-type secondary battery 110 described above is obvious to those skilled in the art and thus is not described in detail. In addition, the cell assembly 100 according to the present disclosure may employ various secondary batteries known at the time of filing of this application.

Meanwhile, the module housing 300 may serve as an exterior material for the battery module 400. Accordingly, the module housing 300 gives structural stability to the battery module 400 and protects components accommodated therein, for example the cell assembly 100, from external physical factors such as impacts and articles. To this end, the module housing 300 may be made of a metal material such as steel or aluminum.

In particular, if the module housing 300 is made of a metal material including aluminum, the heat generated from the cell assembly 100 may be effectively emitted out of the module housing 300 by means of high thermal conductivity of aluminum.

In addition, the module housing 300 may include at least one sidewall 301, 302, 303, 304.

Specifically, when the sidewall 301, 302, 303, 304 is provided in plural, the plurality of sidewalls may be connected to each other. For example, when being observed in the F direction, the sidewalls 301, 302, 303, 304 may include an upper wall 301, a lower wall 302, a left wall 303 and a right wall 304 based on the cell assembly 100, and the sidewalls 301, 302, 303, 304 may be connected to each other.

In addition, the module housing 300 may have an inner space defined by the sidewalls 301, 302, 303, 304 to accommodate the cell assembly 100. Specifically, the inner space may have an internal structure corresponding to the outer shape of the cell assembly 100.

For example, as shown in FIGS. 2 and 3, the upper wall 301 and the lower wall 302 of the module housing 300 may be disposed at right angles to the left wall 303 and the right wall 304 so that the cell assembly 100 having a substantially rectangular parallelepiped shape may be accommodated therein.

Further, the inner space may be provided such that at least one of the upper wall 301, the lower wall 302, the left wall 303 and the right wall 304 of the module housing 300 contacts at least one side of the cell assembly 100. That is, as the area where the sidewalls 301, 302, 303, 304 of the module housing 300 directly contact the outer surfaces of the cell assembly 100 becomes larger, the heat generated from the cell assembly 100 may be more effectively conducted to the module housing 300.

As shown in FIG. 3, the upper wall 301, the lower wall 302, the left wall 303 and the right wall 304 of the module housing 300 may be provided to be in contact with upper, lower, left and right surfaces of the cell assembly 100, respectively.

In addition, the module housing 300 may be configured as a hollow structure where the inner space is opened at both sides. In particular, the hollow structure may be configured such that when a plurality of battery modules 400 are arranged in the front and rear directions, the inner space is opened along the arrangement direction of the battery modules.

More specifically, the module housing 300 may include a mono frame integrally formed with the upper wall 301, the lower wall 302, the left wall 303 and the right wall 304.

Here, the integrated form means that components form a single body by, for example, casting or the like. Specifically, the module housing 300 may be configured so that both ends of the upper wall 301, the lower wall 302, the left wall 303 and the right wall 304 are connected to each other.

For example, as shown in FIG. 2, the module housing 300 may be configured in a rectangular tubular shape in which the module housing 300 is opened in the front and rear direction and both ends of the upper wall 301, the lower wall 302, the left wall 303 and the right wall 304 are connected to each other.

Meanwhile, a cooling channel 310 may be embedded in the sidewalls 301, 302, 303, 304 of the module housing 300.

Specifically, the cooling channel 310 may be configured to allow a cooling fluid (or, a coolant) such as cooling water or air to flow. Here, the cooling fluid may be circulated through a separate circulating supply device (not shown) connected to the cooling channel 310 of the module housing 300.

Moreover, the cooling channel 310 may be formed in at least one sidewall among the sidewalls 301, 302, 303, 304 of the module housing 300. For example, as shown in FIG. 2, three cooling channels 310 may be formed in two sidewalls 303, 304, respectively. As the number of the cooling channels 310 formed in each sidewall increases, the cooling effect of the cell assembly 100 increases. However, if the cooling channels 310 are excessively formed, the durability of the module housing 300 may be deteriorated. Thus, the number of the cooling channel may be set appropriately according to the material, configuration, shape or the like of the module housing.

Thus, according to this configuration of the present disclosure, the heat of the cell assembly 100 may be effectively emitted without a heatsink for discharging the heat generated from the battery module 400, thereby reducing the manufacturing cost and decreasing the volume of the battery module 400.

In addition, the module housing 300 may be manufactured by casting.

Here, the casting may be, for example, die casting, and in the die casting, a metal material may be melted by heating and then injecting into a die with a desired shape to produce a casting. If the module housing 300 is manufactured by the casting, the complicated structure of the cooling channel 310 may be precisely formed without additional finishing work.

Thus, according to this configuration of the present disclosure, compared to a module housing formed by coupling two or more members to each other, the module housing 300, which is integrally formed by casting, may exclude a separate coupling process, thereby reducing the manufacture time. In addition, the module housing 300 may have increased thermal conductivity, compared to a separately prepared and then coupled form, and thus the heat generated from the cell assembly 100 mat be effectively emitted.

Further, the cooling channel 310 may be embedded in the left wall 303 and the right wall 304 of the module housing 300. Specifically, the cooling channel 310 may be formed at upper, middle and lower portions of the left wall 303 and the right wall 304 of the module housing 300, respectively. For example, as shown in FIG. 2, the cooling channel 310 is formed at the upper, middle and lower portions of each of the left wall 303 and the right wall 304 of the module housing 300, and thus three cooling channels 310 are formed at each sidewall.

Thus, according to this configuration of the present disclosure, the thickness of the upper wall 301 and the lower wall 302 may be minimized, compared to the left wall 303 and the right wall 304 of the module housing 300 in which the cooling channel 310 is embedded, and thus the space of the battery module 400 may be utilized more in the vertical direction. Thus, the cell assembly 100 elongated in the vertical direction may be accommodated therein, and the battery module 400 having a higher energy density may be implemented.

Further, the cooling channel 310 may be formed to pass through both ends of the sidewalls 301, 302, 303, 304 of the module housing 300 in the front and rear direction. Specifically, in the cooling channel 310, an inlet 311 for introducing a coolant may be formed at one end surface of the sidewalls 301, 302, 303, 304 of the module housing 300, an outlet 312 for discharging a coolant may be formed at the other end surface of the sidewalls 301, 302, 303, 304 of the module housing 300.

For example, as shown in FIG. 3, the inlet 311 for introducing a coolant may be formed at one end surface of the left wall 303 and the right wall 304 of the module housing 300, and the outlet 312 for discharging a coolant may be formed at the other end surface of the right wall 304 and the left wall 303.

However, the structure of the cooling channel 310 is not necessarily limited thereto but may be suitably modified in consideration of the position of a supply line of the coolant supplied to the cooling channel 310 of the module housing 300 or an arrangement direction of the plurality of battery modules 400.

Further, as shown in FIG. 3, the cooling channel 310 may linearly extends from the inlet 311 to the outlet 312. Specifically, the outlet 312 of the cooling channel 310 may be formed at the other end surface of the sidewall 301, 302, 303, 304 that corresponds to a height parallel to the vertical height of the inlet 311.

Thus, according to this configuration of the present disclosure, if the direction in which the cooling channel 310 linearly extends is identical to the direction in which the plurality of battery modules 400 are arranged, it is possible to minimize the occurrence of interference while the coolant is moving along the cooling channels 310 of the plurality of battery modules 400, and thus the coolant may circulate through to the plurality of battery modules 400 fast without stagnation, thereby improving the cooling efficiency.

However, the structure of the cooling channel is not limited to the linearly extending structure, and the extending structure of the cooling channel may be modified in various ways according to the heat distribution of the accommodated cell assembly 100. For example, the cooling channel may have a bent structure, a curved structure, or the like.

Figure 4:
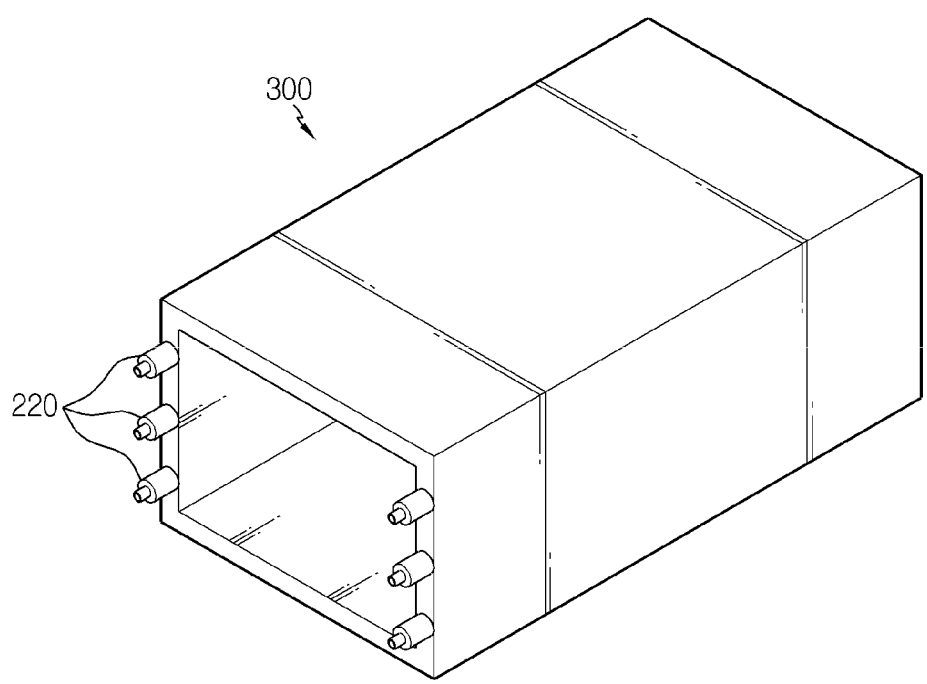
FIG. 4 is a perspective view schematically showing a module housing and a channel connection member employed at a battery module according to another embodiment of the present disclosure.
Figure 5:
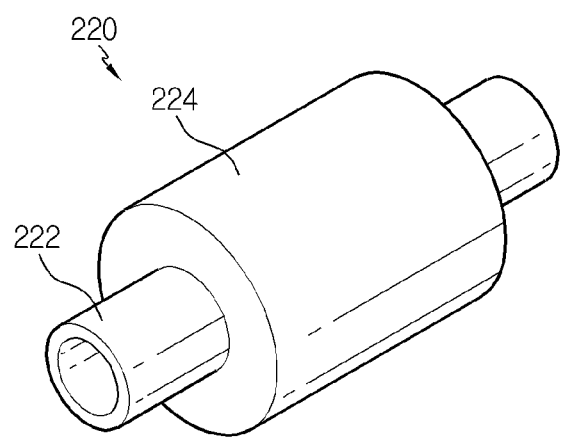
FIG. 5 is a perspective view schematically showing only the channel connection member employed at the battery module according to another embodiment of the present disclosure.
Figure 6:
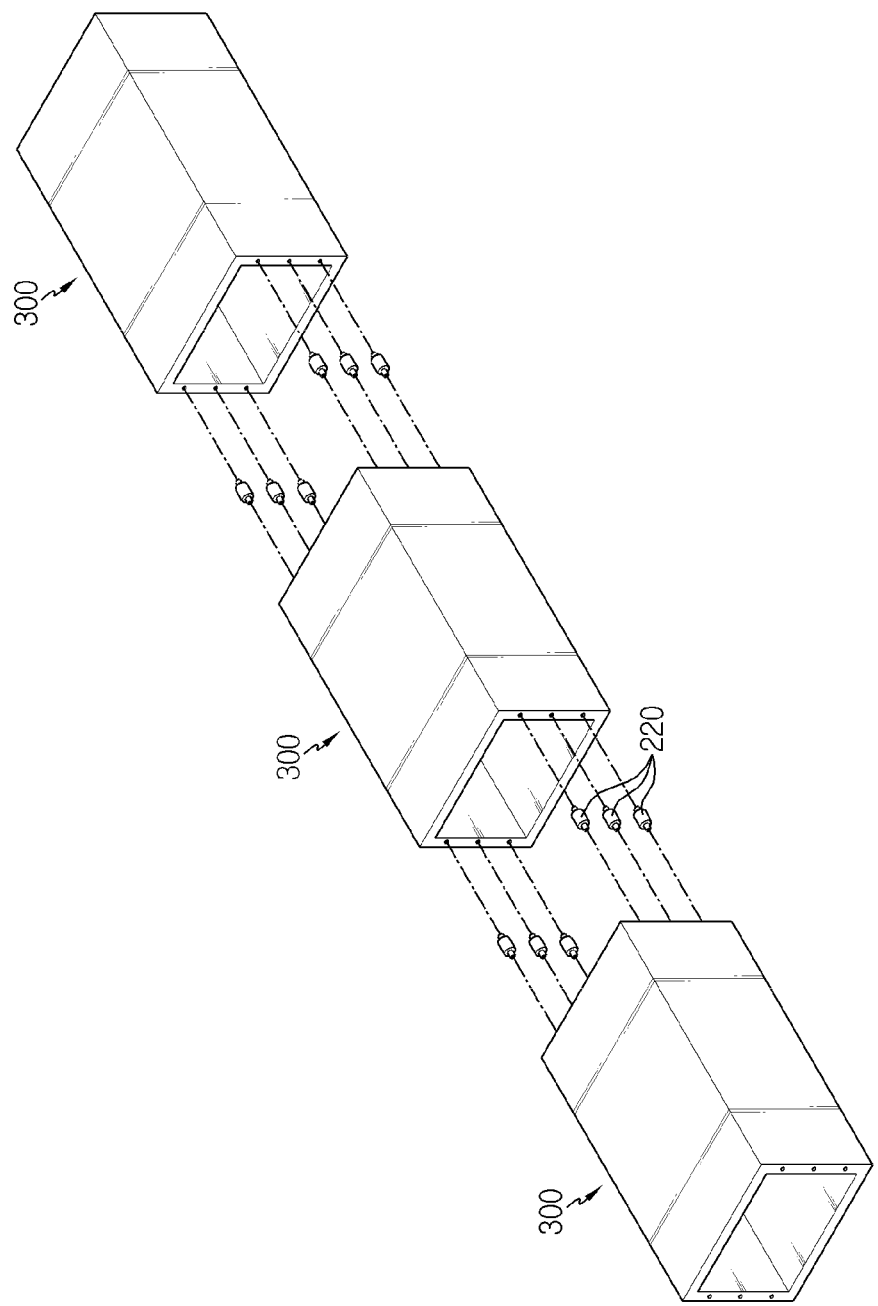
FIG. 6 is an exploded perspective view schematically showing that the battery modules according to another embodiment of the present disclosure are separated from the channel connection member.

FIG. 4 is a perspective view schematically showing a module housing and a channel connection member employed at a battery module according to another embodiment of the present disclosure. Also, FIG. 5 is a perspective view schematically showing only the channel connection member employed at the battery module according to another embodiment of the present disclosure. In addition, FIG. 6 is an exploded perspective view schematically showing that the battery modules according to another embodiment of the present disclosure are separated from the channel connection member. However, for convenience of explanation, the cell assembly is not depicted in FIGS. 4 and 6.

Referring to FIGS. 4 and 6 along with FIG. 2, the battery module 400 may further include a channel connection member 220.

Specifically, the channel connection member 220 may be configured to connect the cooling channel 310 of one module housing 300 to the cooling channel 310 of another module housing 300.

For example, the channel connection member 220 may be located at one or both of one end and the other end of the sidewalls 301, 302, 303, 304 of the module housing 300. For example, as shown in FIG. 6, six channel connection members 220 may be coupled to the other ends (rear ends) of the left wall 303 and the right wall 304 of the module housing 300.

In addition, the channel connection member 220 may be located at both ends of the sidewalls 301, 302, 303, 304 of the module housing 300 in the front and rear direction in the case of the battery module 400 located inside the plurality of the battery modules 400. For example, as shown in FIG. 6, twelve channel connection members 220 may be coupled to both ends in the front and rear direction of the left wall 303 and the right wall 304 of the module housing 300 of the battery module 400 located at the middle among three battery modules 400.

Thus, according to this configuration of the present disclosure, there is an advantage that the cooling channels 310 of the plurality of battery modules 400 may be easily connected simply by inserting a part of the channel connection member 220 into the cooling channels.

Moreover, the channel connection member 220 may include a connection tube 222 and a stopper 224.

Here, the connection tube 222 may be formed to be partially inserted into the cooling channel 310 of the module housing 300.

Specifically, one end of the connection tube 222 may be inserted into the cooling channel 310 of one module housing 300, and the other end of the connection tube 222 may be inserted into the cooling channel 310 of another module housing 300. For example, as shown in FIG. 5, the connection tube 222 may have a tubular shape extending linearly, and both ends of the connection tube 222 may be inserted into the cooling channels 310 of different battery modules 400, respectively.

Here, the stopper 224 may be configured such that only an appropriate portion of the connection tube 222 is inserted into the cooling channel 310.

Specifically, the stopper 224 may be configured to prevent the connection tube 222 from being inserted into the cooling channel 310 beyond an appropriate range while the connection tube 222 is being inserted into the cooling channel 310. For example, the stopper 224 may be disposed at the outer surface of the connection tube 222 and protrude upward, downward, leftward and rightward from the connection tube 222 so as to block the end surface of the module housing 300.

In addition, the stopper 224 may have a hollow structure to surround the outer surface of the connection tube 222. That is, the stopper 224 may be formed in a tubular shape to receive the connection tube 222 therein. At this time, the tubular stopper 224 may set a separation distance between the plurality of battery modules 400 according to the extending length in the front and rear direction.

Further, the connection tube 222 may be configured such that both ends thereof protrude from the stopper 224 in the front and rear direction. That is, the length of both ends of the connection tube 222 protruding from the stopper 224 may become a length inserted into the coolant channel 310. For example, both ends of the connection tube 222 may protrude from the stopper 224 by the same length in the front and rear direction.

Thus, according to this configuration of the present invention, the stopper 224 is inserted only by a preset length of the connection tube 222, so that the channel connection member 220 may be easily installed. In addition, in this case, since the plurality of battery modules 400 may be arranged to keep a certain distance therebetween, the battery modules 400 may be arranged quickly without damaging parts disposed between the plurality of the battery modules 400, thereby enhancing the manufacturing efficiency of the battery pack.

Figure 7:
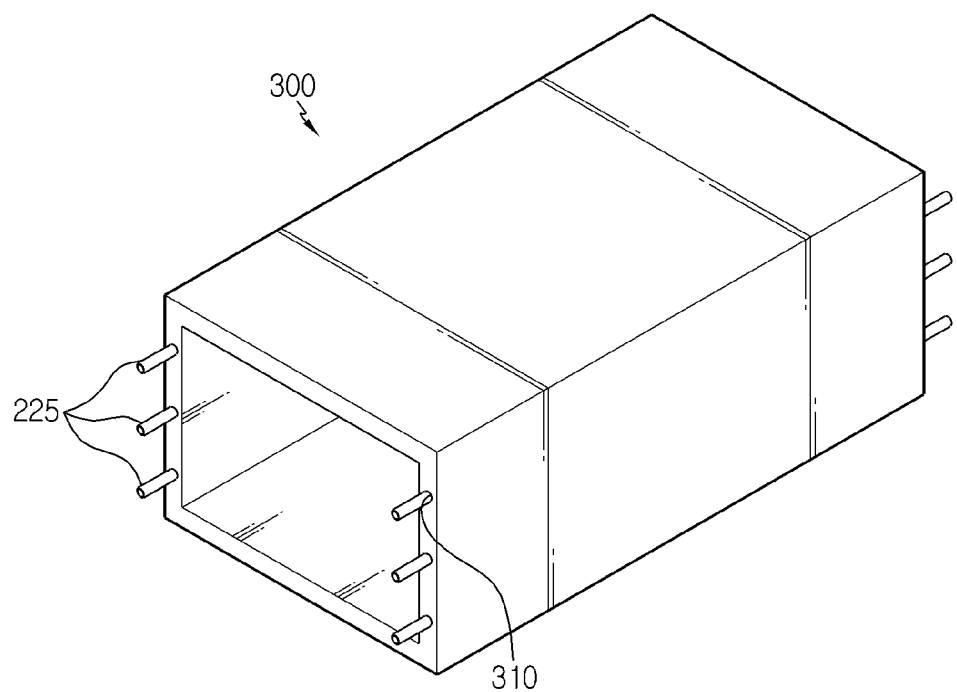
FIG. 7 is a perspective view schematically showing a partial configuration of a battery module according to still another embodiment of the present disclosure.
Figure 8:
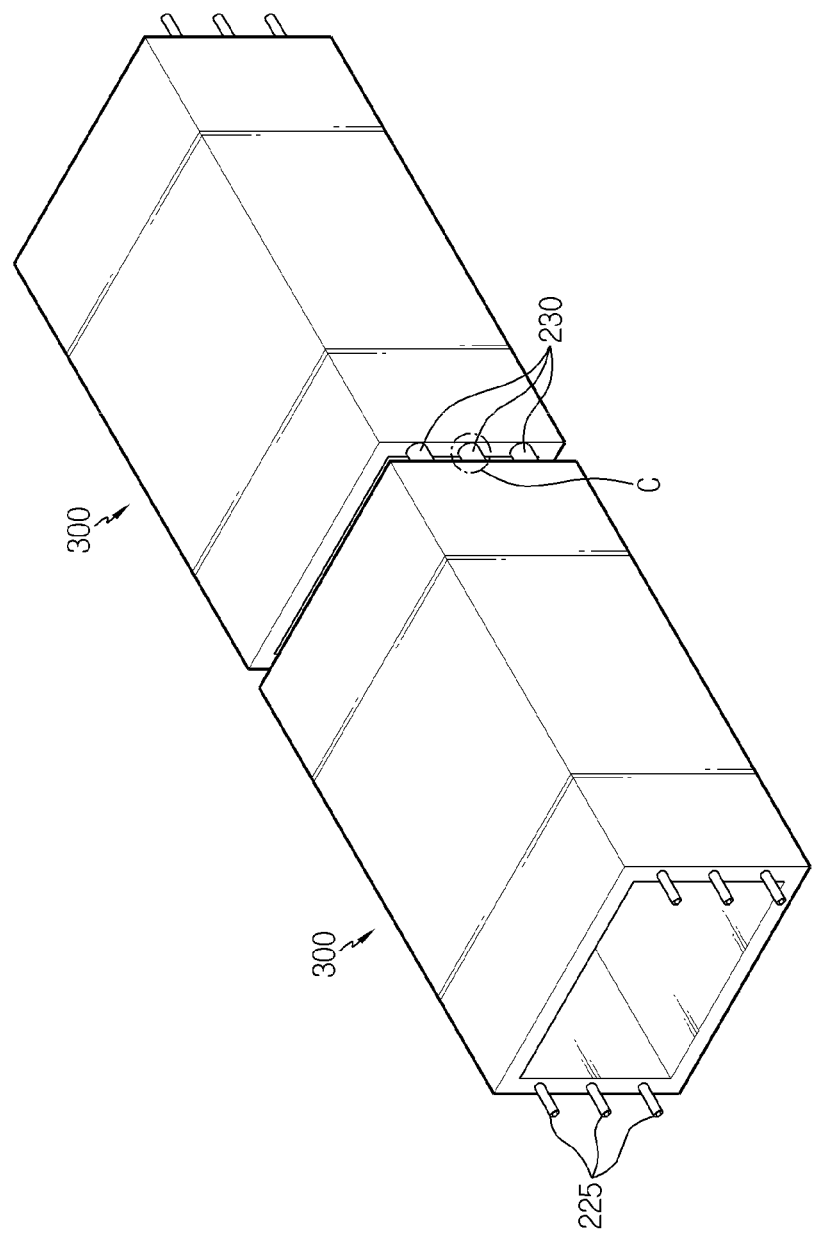
FIG. 8 is a perspective view schematically showing a plurality of battery modules according to still another embodiment of the present disclosure.

FIG. 7 is a perspective view schematically showing a partial configuration of a battery module according to still another embodiment of the present disclosure. Also, FIG. 8 is a perspective view schematically showing a plurality of battery modules according to still another embodiment of the present disclosure. However, for convenience of explanation, the cell assembly 100 is not depicted in FIGS. 7 and 8.

Referring to FIGS. 7 and 8 along with FIG. 2, the channel connection member 220 may include a cooling tube 225.

Here, the cooling tube 225 may have a tube through which a coolant in a fluid form may be transferred. The cooling tube 225 may be made of a material having a dense structure from which air is not able to be leaked. For example, the cooling tube 225 may be made of a metal material. In addition, the cooling tube 225 may be made of a material with excellent thermal conductivity, for example copper or aluminum.

Further, the cooling tube 225 may be formed to be inserted through the cooling channel 310 of the battery module 400 from one end to the other end thereof.

In addition, the cooling tube 225 may have a structure elongated in the front and rear direction so as to connect the cooling channels 310 of the plurality of battery modules 400 to each other. Specifically, the cooling tube 225 may have a length longer than not only the length of one battery module 400 in the front and rear direction but also the length of the plurality of battery modules 400 in the front and rear direction.

Further, as shown in FIG. 3, if the cooling channel 310 extends linearly from the inlet 311 to the outlet 312, the cooling tube 225 is configured to extend linearly, so that not only the cooling channel 310 of one battery module 400 but also the cooling tubes 225 of the plurality of battery modules 400 may be easily inserted and installed.

Thus, according to this configuration of the present disclosure, by connecting the cooling channels 310 of the module housings 300 of the plurality of battery modules 400 using the single long cooling tube 225, it is possible to prevent the leakage of the coolant, which is liable to occur in the connection structure between the cooling channels 310 of the plurality of battery modules 400. In addition, the cooling tube 225 may be arranged in a predetermined direction of the plurality of battery modules 400.

Figure 9:
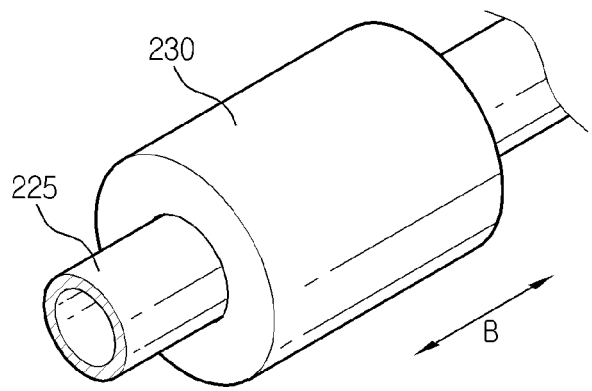
FIG. 9 is an enlarged perspective view showing a gap adjustment member located at a region C, employed at the battery module of FIG. 8.

FIG. 9 is an enlarged perspective view showing a gap adjustment member located at a region C, employed at the battery module of FIG. 8.

Referring to FIG. 9 along with FIG. 8, the battery module 400 may further include a gap adjustment member 230.

Specifically, the gap adjustment member 230 may be interposed between the plurality of battery modules 400 to adjust the gap between the plurality of battery modules 400 constantly. Accordingly, the gap adjustment member 230 may set the separation distance between the plurality of battery modules 400 according to the extending length of the gap adjustment member 230 in the front and rear direction.

In addition, the gap adjustment member 230 may have a hollow structure in which the cooling tube 225 is inserted. Specifically, the gap adjustment member 230 may be formed in a tubular shape having a hollow structure. For example, as indicated by an arrow B in FIG. 9, the gap adjustment member 230 may be formed to be movable in the front and rear direction, namely in the length direction of the cooling tube 225, in a state where the cooling tube 225 is inserted in the hollow structure. For this, the inner diameter of the gap adjustment member 230 may be configured larger than the outer diameter of the cooling tube.

Thus, according to this configuration of the present disclosure, the plurality of battery modules 400 may be easily arranged to be spaced apart by a certain distance by means of the gap adjustment member 230. For this reason, a space for safely installing a bus bar for voltage sensing or electric connection between the plurality of battery modules 400 may be secured more easily. In particular, it is possible to prevent components disposed between the plurality of battery modules 400, particularly exposed portions of the cooling tube 225 from being broken while a battery pack including the plurality of battery modules 400 is being installed, and it is also possible to install the battery pack easily.

Figure 10:
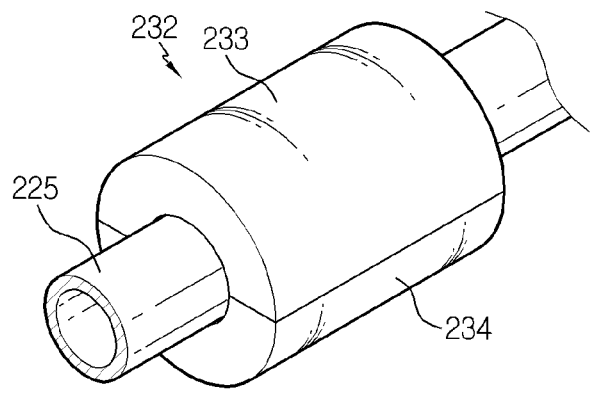
FIG. 10 is a perspective view schematically showing a gap adjustment member inserted into the cooling tube of the battery module according to still another embodiment of the present disclosure.

FIG. 10 is a perspective view schematically showing a gap adjustment member inserted into the cooling tube of the battery module according to still another embodiment of the present disclosure.

Referring to FIG. 10, the gap adjustment member 232 may include an upper cover 233 covering the upper surface of the cooling tube 225 and a lower cover 234 covering the lower surface of the cooling tube 225.

Thus, according to this configuration of the present disclosure, even in a state where the cooling tube 225 is inserted into the coolant channel 310 of the module housing 300, the gap adjustment member 232 may be easily installed on the cooling tube 225 by using the divided structure like the upper cover 233 and the lower cover 234.

Here, the gap adjustment member 232 may have a coupling structure in which the upper cover 233 and the lower cover 234 are coupled to each other. Specifically, in the coupling structure, the upper cover 233 may be mounted onto an upper portion of the cooling tube 225 in a lower direction, and then the lower cover 234 may be fastened to the upper cover 233 in an upper direction.

For example, the coupling structure may employ a male and female coupling structure in which the upper cover 233 and the lower cover 234 may be engaged with each other by elastic coupling when being pressed against each other in a contacting state to face each other and thus ensure easy coupling. However, the present disclosure is not necessarily limited to the above coupling structures, and any known coupling method may also be applied.

Meanwhile, even though FIG. 10 depicts that the gap adjustment member 230 includes both the upper cover 233 and the lower cover 234, the present disclosure is not necessarily limited thereto. For example, the gap adjustment member 230 may include only one of the upper cover 233 and the lower cover 234 and be interposed between the plurality of battery modules 400.

Figure 11:
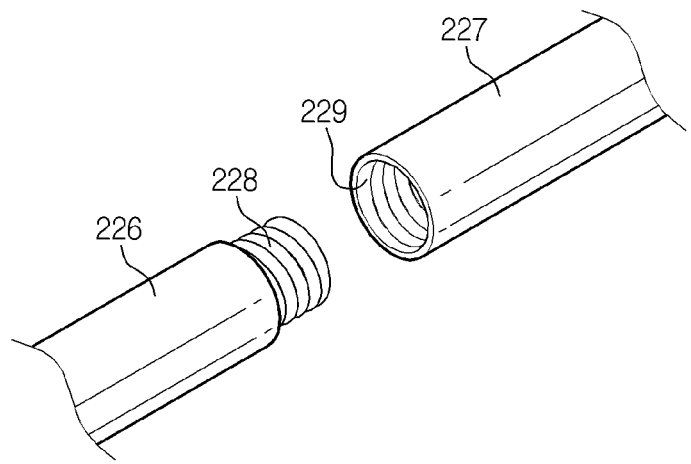
FIG. 11 is an exploded perspective view showing that a partial portion of the cooling tube in a region C is separated from the battery module of FIG. 8.

Thus, according to this configuration of the present disclosure, it is possible to ensure a separation distance between the plurality of battery modules 400 by using any one of the upper cover 233 and the lower cover 234, thereby saving the manufacture cost or the like FIG. 11 is an exploded perspective view showing that a partial portion of the cooling tube in a region C is separated from the battery module of FIG. 8.

Referring to FIG. 11 along with FIG. 8, the cooling tube 225 may include a plurality of tubes 226, 227 whose ends in the length direction are connected to each other. That is, the cooling tube 225 may be formed to connect an end of one tube 226 and an end of another tube 227 to each other, thereby extending the entire length of the cooling tube 225.

Also, the tube 226 may have a coupling structure 228, 229 at one end in the length direction, which is connected to an end of another tube 227. Specifically, the coupling structure 228, 229 may be configured in a tubular screw form. For example, the coupling structure 228, 229 may have a structure in which a tubular male screw 228 is formed at one end of the tube 226 and a tubular female screw 229 is formed at the other end of the tube 227.

Thus, according to this configuration of the present disclosure, if the cooling tube 225 is installed at the plurality of battery modules 400, the plurality of tubes 226, 227 may be connected to each other in the length direction according to a required length of the cooling tube 225, and thus it is easy to extend the length in the front and rear direction.

In addition, the cooling tube 225 may be easily installed by inserting divided tubes 226 into the plurality of battery modules 400, respectively, and then connecting the ends of the inserted tubes 226 to each other, rather than by inserting a single lone cooling tube 225 into the plurality of battery module 400.

In addition, a battery pack according to the present disclosure may include two or more battery modules 400 according to the present disclosure. Also, the battery pack may further include, in addition to the battery module 400, various devices for controlling charge and discharge of the cell assembly 100, for example a battery management system (BMS), a current sensor, a fuse and the like.

In addition, the battery pack according to the present disclosure may be applied to a vehicle such as an electric vehicle or a hybrid electric vehicle. In other words, the vehicle according to the present disclosure may include the above battery pack.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module, in particular, the present disclosure may be applied to industries associated with a battery pack configured using the battery modules and a vehicle driven by the battery pack, for example an electrical vehicle.

What is claimed is:

1. A battery module, comprising:
   a cell assembly including a plurality of secondary batteries;
   a module housing forming an exterior of the battery module and including:
      at least one sidewall configured to accommodate the cell assembly in an inner space defined by the at least one sidewall;
      at least one cooling channel embedded within the at least one sidewall between an outer surface and an inner surface of the at least one sidewall, the at least one cooling channel being configured to accommodate a coolant to flow therethrough; and
   at least one channel connection member for respectively connecting the at least one cooling channel to at least one cooling channel of a module housing of another battery module along one single straight line in a front and rear direction parallel to the at least one side wall,
   wherein each of the at least one cooling channel includes:
      an inlet formed at a front end surface of the at least one sidewall to introduce the coolant; and
      an outlet formed at a rear end surface of the at least one sidewall to discharge the coolant,
   wherein each of the at least one channel connection member includes:
      a connection tube inserted into and past the inlet or the outlet of a corresponding one of the at least one cooling channel embedded within the at least one side wall, the connection tube being partially inserted into the corresponding cooling channel and extending in the front and rear direction within the at least one side wall; and
      a stopper having a hollow structure to surround an outer surface of the connection tube, the stopper being disposed at the outer surface of the connection tube, protruding upward, downward, leftward, and rightward from the connection tube, and butting against the front or rear end surface of the at least one side wall to set a separation distance between the module housings of the battery module and the other battery module according to an extending length of the stopper in the front and rear direction, and
   wherein each of the at least one cooling channel extends linearly from the inlet to the outlet in one single straight line in the front and rear direction parallel to the at least one sidewall.

2. The battery module according to claim 1, wherein:
   the at least one sidewall includes an upper wall, a lower wall, a left wall, and a right wall; and
   the at least one cooling channel is embedded in the left wall and the right wall, respectively.

3. The battery module according to claim 2, wherein the at least one cooling channel passes through both front and rear ends of the left wall and the right wall, respectively, of the module housing in the front and rear direction.

4. The battery module according to claim 1, wherein the module housing has a hollow structure at which the inner space is opened at both front and rear ends.

5. The battery module according to claim 1, wherein:
   the at least one channel connection member is located at a front or rear end, or at both the front and rear ends, of the at least one sidewall of the module housing in the front and rear direction.

6. The battery module according to claim 5, wherein both ends of the connection tube protrude from the stopper in the front and rear direction from the stopper along the one single straight line.

7. A battery module, comprising:
   a cell assembly including a plurality of secondary batteries;
   a module housing forming an exterior of the battery module and including:
      at least one sidewall configured to accommodate the cell assembly in an inner space defined by the at least one sidewall;
      at least one cooling channel embedded within the at least one sidewall between an outer surface and an inner surface of the at least one sidewall, the at least one cooling channel being configured to accommodate a coolant to flow therethrough;
   at least one channel connection member for respectively connecting the at least one cooling channel to at least one cooling channel of a module housing of another battery module along one single straight line in a front and rear direction parallel to the at least one side wall; and
   a gap adjustment member interposed between the module housing of the battery module and the module housing of another battery module, the gap adjustment member butting against a front or rear end surface of the at least one side wall to set a separation distance between the module housing of the battery module and the module housing of another battery module according to an extending length of the gap adjustment member in the front and rear direction,
   wherein each of the at least one cooling channel includes:
      an inlet formed at a front end surface of the at least one sidewall to introduce the coolant; and
      an outlet formed at a rear end surface of the at least one sidewall to discharge the coolant,
   wherein each of the at least one cooling channel extends linearly from the inlet to the outlet in one single straight line in the front and rear direction parallel to the at least one sidewall,
   wherein each of the at least one channel connection member includes a cooling tube extending through a corresponding one of the at least one cooling channel from one of the inlet and the outlet to the other of the inlet and the outlet of the corresponding cooling channel, the cooling tube having ends respectively protruding out of the inlet and the outlet of the corresponding cooling channel in the front and rear direction and having a coupling structure at one or both of the ends for connection with another cooling tube, and
   wherein the gap adjustment member has a hollow structure into which the cooling tube is inserted.

8. The battery module according to claim 7, wherein the gap adjustment member includes:
   an upper cover configured to cover an upper surface of the cooling tube; and
   a lower cover coupled to the upper cover, the lower cover being configured to cover a lower surface of the cooling tube.

9. The battery module according to claim 7, wherein the cooling tube includes a plurality of tubes whose ends in a length direction are connected to each other.

10. A battery pack, comprising two or more battery modules defined in claim 1, the two or more battery modules including a first battery module and a second battery module connected to each other in the front and rear direction.

11. A vehicle, comprising the battery pack defined in claim 10.

12. The battery module of claim 2, wherein the upper wall and the lower wall have a smaller thickness than the left wall and the right wall.

13. The battery module of claim 2, wherein the upper wall, the lower wall, the left wall, and the right wall form a mono frame.

14. The battery module of claim 2, wherein the upper wall, the lower wall, the left wall, and the right wall form a rectangular tubular shape with a hollow center.

15. The battery pack of claim 10, wherein the outlet of each of the at least one cooling channel of the first battery module is connected to the inlet of a corresponding one of the at least one cooling channel of the second battery module along the one single straight line in the front and rear direction.

16. The battery pack of claim 10, further comprising:
a cooling tube disposed in the at least one cooling channel of the first battery module and extending to the at least one cooling channel of the second battery module along the one single straight line in the front and rear direction to accommodate a coolant flow between the at least one cooling channel of the first battery module and the at least one cooling channel of the second battery module.

17. The battery pack of claim 16, further comprising:
a gap adjustment member interposed between the first battery module and the second battery module, the gap adjustment member being in direct contact with the module housing of the first battery module and the module housing of the second battery module to maintain the module housings spaced apart from each other, wherein the gap adjustment member is disposed outside the module housings and has a hollow center to accommodate the cooling tube outside and between the module housings.

18. The battery module according to claim 7, wherein the cooling tube include a male tubular screw at one of the ends and a female tubular screw at the other of the ends.

19. The battery module according to claim 1, wherein the stopper surrounds the outer surface of the connection tube outside the module housing.

* * * * *